United States Patent [19]

Abe

[11] Patent Number: 4,865,630
[45] Date of Patent: Sep. 12, 1989

[54] POROUS MEMBRANE FOR USE IN REACTION PROCESS

[76] Inventor: Fumio Abe, 106, Shingu-cho, 1-chome, Handa-city, Aichi-Pref, 475, Japan

[21] Appl. No.: 942,799

[22] Filed: Dec. 17, 1986

[30] Foreign Application Priority Data

Dec. 28, 1985 [JP] Japan ................. 60-299545

[51] Int. Cl.$^4$ .......................... B01D 53/22
[52] U.S. Cl. ..................... 55/158; 55/524; 422/180
[58] Field of Search ............ 55/16, 158, 524; 210/500.25, 500.26, 504, 510.1; 422/168, 180, 222

[56] References Cited

U.S. PATENT DOCUMENTS

| | | |
|---|---|---|
| 1,685,759 | 9/1928 | Walter ............... 55/16 X |
| 2,824,620 | 2/1958 | deRosset ............ 55/16 |
| 2,958,391 | 11/1960 | deRosset ........... 55/16 |
| 3,022,187 | 2/1962 | Eyraud et al. ...... 55/16 X |
| 3,210,162 | 10/1965 | Rudd .............. 55/158 X |
| 3,241,298 | 3/1966 | Pierce ............. 55/16 X |
| 3,244,763 | 4/1966 | Cahn .............. 55/16 X |
| 3,413,777 | 12/1968 | Langley et al. ..... 55/158 |
| 4,063,937 | 12/1977 | Goltsov et al. .... 55/16 X |
| 4,329,157 | 5/1982 | Dobo et al. ....... 55/16 |
| 4,583,996 | 4/1986 | Sakata et al. ..... 55/16 |
| 4,598,056 | 7/1986 | Barraud et al. .... 502/4 |

FOREIGN PATENT DOCUMENTS

| | | |
|---|---|---|
| 0135069 | 3/1985 | European Pat. Off. . |
| 0151358 | 8/1985 | European Pat. Off. . |
| 2444541 | 6/1975 | Fed. Rep. of Germany . |
| 1792793 | 8/1980 | Fed. Rep. of Germany .... 55/16 |
| 2148936 | 3/1973 | France . |
| 7578 | 1/1978 | Japan ........ 55/16 |
| 59-223 | 4/1984 | Japan . |
| 177117 | 10/1984 | Japan ........ 55/16 |

OTHER PUBLICATIONS

Chemical Abstracts, vol. 105 (1986) 105:215614a.

Primary Examiner—Robert Spitzer

[57] ABSTRACT

A porous membrane adapted for use in a chemical reaction process, the porous membrane being formed with interconnected micropores having an average pore size less than 100am (1000 Å) and containing a catalytic component such as molybdenum sulfide, platinum-alumina, palladium-silica-alumina or the like uniformly distributed therein.

12 Claims, 2 Drawing Sheets

POROUS MEMBRANE FOR USE IN REACTION PROCESS

BACKGROUND OF THE INVENTION

1. Field of the Invention

The present invention relates to a porous membrane adapted for use in a chemical reaction process.

2. Description of the Prior Art

In the field of gas-separation in which a gas diffusion method is adapted to separate a specific gas from a mixture of gases, there has been utilized a porous membrane which is formed with interconnected micropores having an average pore size of between several ten Å and several hundred Å, smaller than the mean free path of gas molecules. In Japanese Patent Early Publication No. 59-59223, disclosed is such a porous membrane adapted to separate hydrogen gas from a mixture of hydrogen and nitrogen or carbon monoxide the molecular weight ratio of which is relatively large. The separation of hydrogen gas from the mixture is carried out based on the difference in rates of permeability of the gases in Knudsen flow.

In recent years, it has been found that the characteristic of the porous membrane in gas separation is useful for a chemical reaction process. Where the reaction rate of a catalytic reaction process ($A \rightleftarrows B + P$) is noticeably decreased due to the pressure of product gas P or the reaction is restricted by equilibrium, the porous membrane is effective to exhaust the product gas P from the reaction system therethrough to enhance the percent conversion of the product gas and the efficiency of separation and concentration of the product gas P. On Pages 58-61 of Chemical Engineering issued on February, 1984, such as reaction process is disclosed as a decomposition reaction process of hydrosulfide ($H_2S = H_2 + S$), wherein, as shown in FIG. 7, the porous membrane is in the form of a porous glass pipe 1 which is filled with catalytic particles 2 of molybdenum sulfide to effect the decomposition reaction of raw material gases supplied therein and to concentrate the product gas dependent upon the difference in pressure between the interior and exterior of pipe 1.

In the reaction process described above, however, insufficient separation of the product sometimes occurs due to insufficient membrane area per unit volume of porous membrane and insufficient contact of the product gas with the porous membrane. This results in low percent conversion of the product gas. Additionally, the presence of catalytic particles 2 results in loss of pressure of the raw material gases passing through the glass pipe 1, and the pores of glass pipe 1 are clogged with powder of the catalytic particles.

SUMMARY OF THE INVENTION

It is, therefore, a primary object of the present invention to provide a porous membrane capable of enhancing the percent conversion of the product gas in chemical reactions and the efficiency of separation and concentration of the product gas without causing any of the problems described above.

According to the present invention, the primary object is attained by providing a porous membrane which is formed with numerous interconnected micropores and superior in selective permeability and catalytic activity. The porous membrane is in the form of a single layer formed with numerous interconnected micropores having an average pore size less than 1000 Å and containing therein a catalytic component such as molybdenum sulfide, platinum-alumina, palladium-silica-alumina or the like essentially in a uniform condition. Alternatively, the porous membrane may be in the form of a multiple layered porous membrane which is composed of a porous support formed with numerous interconnected micropores, at least a porous thin layer integrally formed on the porous support and being formed with numerous interconnected micropores having an average pore size less than that of the micropores in the porous support, wherein the average pore size of the micropores in the porous thin layer is essentially less than 1000 Å, and either the porous support or the porous thin layer contains therein the catalytic component essentially in a uniform condition.

BRIEF DESCRIPTION OF THE DRAWINGS

Additional features and advantages of the present invention will become more readily apparent from the following detailed description of preferred embodiments thereof when considered with reference to the accompanying drawings, in which:

FIG. 6 (b) is a front view of the reaction apparatus depicted along arrows in FIG. 6 (a)

DESCRIPTION OF THE PREFERRED EMBODIMENTS

Figure 1:
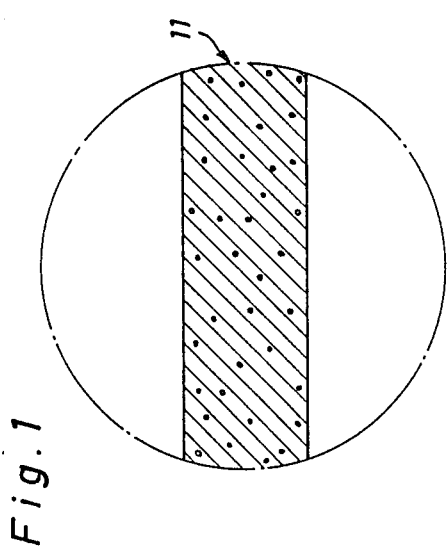

In FIG. 1 of the drawings, there is schematically illustrated a single layer porous membrane 11 which is formed with numerous interconnected micropores having an average pore size less than 1000 Å and containing therein a catalytic component essentially in a uniform condition. For use in a chemical reaction process under relatively high temperature and pressure, it is preferably that the porous membrane 11 be made of an inorganic raw material such as alumina, silica-alumina, zirconia, zeolite, porous glass, carbon or the like. To uniformly contain the catalytic component in the porous membrane, the inorganic raw material is uniformly mixed with the catalytic component raw material by means of a coprecipitation method or a kneading method and is formed in a desired configuration. Alternatively, the inorganic raw material is preliminarily formed in a desired configuration and the catalytic component raw material is added by means of an impregnation method, an adsorption method or an ion-exchange method. In this embodiment, a supported precious metal catalyst such as platinum-alumina. palladium-silica-alumina or the like may be used as the catalytic component raw material in accordance with the chemical reaction process. When using the porous membrane 11 in a process for the decomposition of hydrosulfide, molybdenum sulfide is used as the catalytic component raw material. In this case, it has been found that the average pore size of the micropores in porous membrane 11 is closely related to selective gas permeability. For this reason, it is desirable that in use of the porous membrane 11 under high temperature and pressure, the average pore size is less than 200 Å.

Figure 3:
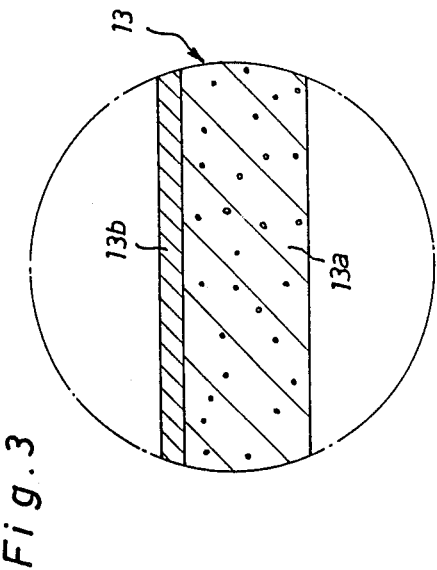
FIGS. 1 to 5 schematically illustrate respective enlarged cross-sections of porous membranes in accordance with the present invention.
Figure 2:
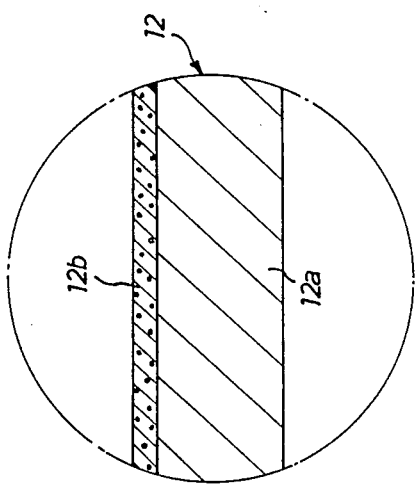
Figure 7:
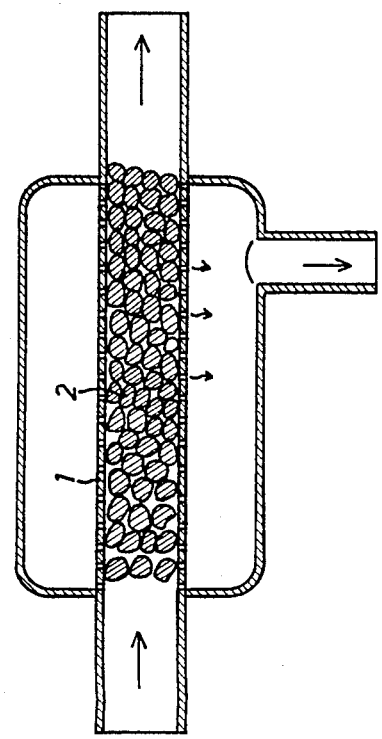
FIG. 7 is is a sectional view of a conventional reaction apparatus.

In FIG. 2 there is schematically illustrated a double layered porous membrane 12 which is composed of a porous support 12a and a porous thin layer 12b integrally formed on the porous support 12a and containing therein a catalytic component essentially in a uniform condition. Similarly, FIG. 3 illustrates another double layered porous membrane 13 which is composed of a porous support 13a containing therein a catalytic component essentially in a uniform condition, and a porous thin layer 13b integrally formed on the porous support 13a. In the double layered porous membranes 12 and 13, it is preferable that the porous supports 12a, 13a each are made of an inorganic raw material such as alumina, silica-alumina, mullite, cordierite, zirconia, carbon or the like. The porous supports 12a, 13a are each formed in a desired configuration under the same conditions as the conventional conditions for forming a ceramic porous support and subjected to a firing or heating treatment. During the forming process of the porous support 13a, the same catalytic component raw material as that of the single layer porous membrane 11 is added to the inorganic raw material by means of the impregnation, adsorption or ion-exchange. The porous supports 12a, 13a each are formed with numerous interconnected micropores having an average pore size of about 0.5 μm to 30 μm, preferably about 0.5μ to 5 μm. In this instance, the average pore size of the micropores is chosen so as to reliably effect gas diffusion and to eliminate the occurrence of cracks or pin-holes in the porous support. From the point of view of strength and processability, it is preferable that the thickness of the porous support be about 1 mm.

The porous thin layers 12b, 13b each are made of the same raw material as that of the single layer porous membrane 11 and are integrally formed on one surface of the respective porous supports 12a, 13a by means of a sol-gel method, a high pressure adherence method of fine powder, an adherence method of porous glass or the like. The catalytic component of the porous thin layer 12b is contained in the inorganic raw material in the same manner as that in the porous support 13a. The porous thin layers 12b, 13b each are formed with numerous interconnected micropores having an average pore size less than 1000 Å. Preferably, the thickness of the porous thin layer is less than 500 μm, desirably about 10 Å to 100 μm. This is useful to reliably effect gas-diffusion and to eliminate the occurrence of cracks or pin-holes in the porous thin layer. In this respect, it has been also found that the average pore size of the micropores in respective porous thin layers 12b, 13b and the thickness of the same are closely related to the selective permeability of the double layered porous membranes 12, 13. In the double layered porous membrane 12, it is advantageous that the porous thin layer 12b be formed as thinly as possible to enhance the selective permeability thereof in comparison with the single layer porous membrane 11 shown in FIG. 1. In the double layered porous membrane 13, it is advantageous that the porous support 13a contain therein a sufficient amount of catalytic component so as to enhance the catalytic activity of the porous membrane 13. In this sense, the porous thin layer 13a itself may be made of the catalytic component.

Figure 4:
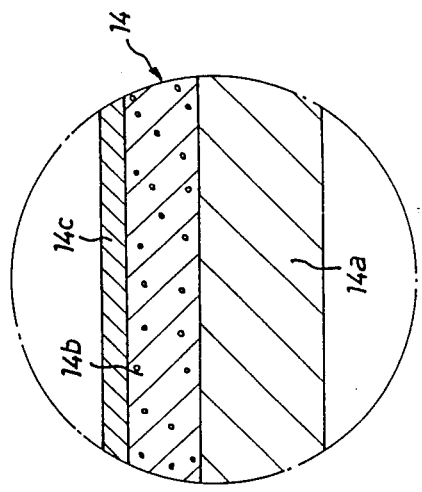
Figure 5:
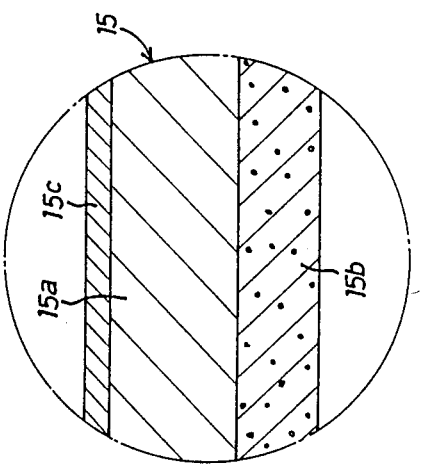

In FIG. 4 there is schematically illustrated a triple layered porous membrane 14 which is composed of a porous support 14a, a first porous thin layer 14b integrally formed on the porous support 14a, and a second porous thin layer 14c integrally formed on the first porous thin layer 14b. In the porous membrane 14, the first porous thin layer 14b contains therein the same catalytic component as that of the single layer porous membrane 11, and the second porous thin layer 14c is formed to provide selective permeability. In FIG. 5 there is schematically illustrated another triple layered porous membrane 15 which is composed of a porous support 15a, and first and second porous thin layers 15b and 15c integrally formed on the opposite surfaces of the porous support 15a. In the porous membrane 15, the first porous thin layer 15b contains therein the catalytic component, and the second porous thin layer 15c is formed to provide selective permeability. The component of the respective porous supports 14a, 15a is substantially the same as that of the porous support 12a, the component of the respective porous thin layers 14b, 15b is substantially the same as that of the porous thin layer 12b, and the component of the respective porous thin layers 14c, 15c is substantially the same as that of the porous thin layer 13b. In addition, the average pore size of respective micropores in the first porous thin layers 14b, 15b and the thickness of the same are greater than those of the porous thin layer 12b, and the second porous thin layers 14c, 15c may be modified to contain therein the catalytic component.

In a practical embodiment of the present invention, the pore size in the foregoing porous membranes 11–15 can be adjusted by the composition of the raw material, mechanical treatment, heat treatment, the firing or the like. For instance, the adjustment of the pore size to less than 1000 Å can be carried out by the following method. In a sol-gel process for gelidifying fine sol-primary particles obtained by hydrolysis of metal alcoxide, the sol-primary particles are merely gelidified to provide a porous body formed with numerous micropores having an average pore size less than 200 Å. To obtain a porous body with numerous micropores having an average pore size of about 200 Å to about 1000 Å, the sol-primary particles are temporarily fired at a temperature below 900° C. to obtain fine powder thereof. Subsequently, an appropriate amount of the fine powder is added to the sol-particles or pulverized in a dry condition to be used as a carrier slurry. In a method for manufacturing porous glass, the average pore size in the porous membrane can be adjusted by an a appropriate selection of the composition of phase-separable glass particles, the temperature of phase-separation treatment, and the melting treatment condition. In an adherence method of fine powder under a high pressure, an isostatic press method is applied to powder of particle diameter less than 1 μm to obtain a porous body formed with micropores having an average pore size less than 1000 Å.

In a practical embodiment of the present invention, each of the porous membranes 11–15 is used as a desired module in the form of a plate member, a pipe element, a honeycomb structure or the like. Assuming that in such a module an amount of reaction fluid flows along one side of the porous membrane, a chemical reaction of the fluid is caused by catalytic activity of the porous membrane such that a specific product fluid is separated from the reaction fluid and concentrated by the selective permeability of the porous membrane. In such a use of the porous membrane, it is not necessary to contain catalytic particles within the porous membrane pipe as in the conventional reaction process. For this reason, the membrane area in a volume unit of the porous membrane is increased to ensure sufficient contact of the reaction fluid with the porous membrane, the pressure loss of the reaction fluid is decreased, and clogging of the pores in the porous membrane is avoided. It is, therefore, possible to enhance percent conversion of the product fluid from the reaction fluid. Owing to these facts, the reaction apparatus can be constructed in a small space. Although the porous membrane can be utilized in various reaction processes for a dehydrogenation reaction, a hydrogenation reaction a hydrogenolysis reaction and the like, it is desirable that the porous membrane be utilized in a reaction process for gas separation, for instance, in a process for collecting hydrogen from purge gases in a decomposition reaction of hydrosulfide, ammonia synthesis, methanol synthesis and the like.

Hereinafter, the respective manufacturing methods of the porous membranes 11-15 for use in a decomposition reaction process of hydrosulfide will be described in detail.

EXAMPLE 1

For manufacturing a porous membrane 11 in the form of a pipe element, boehmite-sol obtained by hydrolysis of aluminum isopropoxide was mixed with molybdenum sulfide having an average particle diameter of 1 $\mu$ and pulverized in a ball mill to prepare a slip thereof. The slip was dried by a spray dryer, mixed with an organic binder, and formed by extrusion into a pipe element. The pipe element was dried at a temperature of 100° C. for two hours, thereafter fired at a temperature of 400° C. for three hours in atmospheric air, and further heat treated at a temperature of 800° C. for three hours in a flow of nitrogen. The composition of the resultant pipe element is listed in the Table.

EXAMPLE 2

For manufacturing a porous membrane 12 in the form of a pipe element, the slip obtained in Example 1 was used as a dipping slurry. The slurry was applied to cover the internal surface of a pipe-shaped porous support (12a) of cordierite, dried at a temperature of 100° C. for two hours, thereafter fired at a temperature of 400° C. for three hours in the atmospheric air, and further heat treated at a temperature of 800° C. for three hours in a flow of nitrogen to form a porous thin layer (12b) on the internal surface of the pipe-shaped porous support (12a). The composition of the resultant pipe element is listed in the Table.

EXAMPLE 3

For manufacturing a porous membrane 13 in the form of a pipe element, molybdenum sulfide having an average particle diameter of 1 $\mu$m was added to an organic binder and formed by extrusion into a pipe-shaped element. The pipe-shaped element was dried at a temperature of 100° C. for two hours, fired at a temperature of 400° C. for three hours in atmospheric air, and further heat treated at a temperature of 800° C. for three hours in a flow of nitrogen to obtain a pipe-shaped porous support (13a) of molybdenum sulfide. Subsequently, boehmite-sol obtained by hydrolysis of aluminum isopropoxide was applied to cover the external surface of the pipe-shaped porous support (13a) and fired at a temperature of 400° C. for three hours in atmospheric air to form a porous thin layer (13b) on the external surface of the pipe-shaped porous support (13a). The composition of the resultant porous pipe element is listed in the Table.

EXAMPLE 4

For manufacturing a porous membrane 14 in the form of a pipe element, slurry A in the form of molybdenum sulfide having an average particle diameter of 1 $\mu$m was applied to cover the internal surface of a pipe-shaped porous support (14a) of cordierite, dried at a temperature of 100° C. for two hours, thereafter fired at a temperature of 400° C. for three hours in atmospheric air, and further heat treated at a temperature of 800° C. for three hours in a flow of nitrogen to form a first porous thin layer (14b) on the internal surface of the pipe-shaped porous support (14a). Subsequently, slurry B in the form of boehmite-sol obtained by hydrolysis of aluminum isopropoxide was applied to cover the internal surface of the first porous thin layer (14b), dried at a temperature of 100° C. for two hours, thereafter fired at a temperature of 400° C. for three hours in atmospheric air to form a second porous thin layer (14c) on the first porous thin layer (14b). The composition of the resultant porous pipe element is listed in the Table.

EXAMPLE 5

For manufacturing a porous membrane 15 in the form of a pipe element, the pipe-shaped porous support of Example 4 was used as a pipe-shaped porous support (15a), and the slurry A of Example 4 was applied to cover the internal surface of the pipe-shaped porous support (15a), fired and heat treated in the same manner as in Example 4 to form a first porous this layer (15b) on the internal surface of the pipe-shaped porous support (15a). Additionally, the slurry B of Example 4 was applied to cover the external surface of the pipe-shaped porous support (15a) and fired in the same manner as in Example 4 to form a second porous thin layer (15c) on the external surface of the pipe-shaped porous support (15a). The composition of the resultant porous pipe element is listed in the Table.

COMPARATIVE EXAMPLE

A first comparative example 1 was prepared in the form of a porous pipe element (16) made of cordierite and filled with beads of molybdenum sulfide having an average particle diameter of 1 mm. A second comparative example 2 was prepared in the form of a porous pipe element (17) made of cordierite, the external surface of which was covered by the slurry B of Example 4, fired, heat treated, and filled with beads of molybdenum sulfide. The respective compositions of the porous pipe elements (16) and (17) are listed in each column of Comparative Examples 1 and 2 on the table.

TEST

Figure 6B:
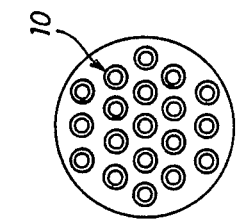
FIG. 6 (a) is a sectional view of a reaction apparatus in which the porous membranes each are utilized as a module of the apparatus.
Figure 6A:
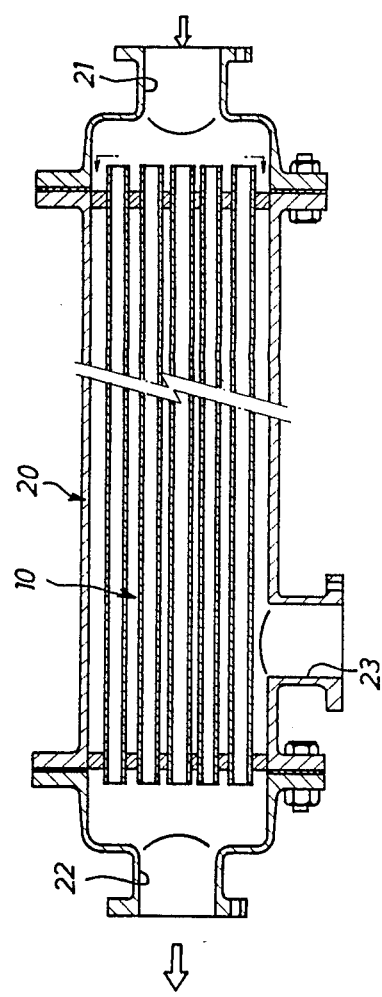

The respective porous pipe elements in the foregoing Examples 1-5 and Comparative Examples 1 and 2 were tested for the decomposition reaction of hydrosulfide in a reaction apparatus such as in illustrated in FIGS. 6(a) and 6(b). The reaction apparatus comprises a plurality of parallel pipe elements 10 mounted within a cylindrical casing 20. In this test, the respective porous pipe elements in the foregoing Examples were used as the parallel pipe elements 10 to measure the decomposition reaction of hydrosulfide. The cylindrical casing 20 is formed at its opposite ends with an inlet port 21 and a first outlet port 22 and formed at its intermediate portion with a second outlet port 23. In using the reaction apparatus, an amount of hydrosulfide gas was supplied into the parallel pipe elements 10 through the inlet port 21 of casing 20, a mixture of sulfur gas and non-reacted hydrosulfide gas was exhausted from the first outlet port 22 of casing 20, and the hydrogen gas produced was exhausted from the second outlet port 23 of casing 20. The test results given in the table were obtained by measurement of concentration of the separated hydrogen gas using a gas chromatographic adsorption under the following condition.

SV *1: 500 hr$^{-1}$
Pressure of supplied gas: 3.8 atm
Pressure at the second outlet port: 0.5 atm
Reaction temperature: 800° C.

where SV *1 represents an amount of supplied gas per a volume unit of catalyst.

TABLE

| Example No. | Membrane | | Thickness | Pore Size | MoSx *2 | H$_2$ *4 |
|---|---|---|---|---|---|---|
| 1 | 11 | | 1 mm | 100Å | 30 | 9.5 |
| 2 | 12 | 12a | 1 mm | 5μ | — | 10.5 |
|   |    | 12b | 100μ | 100Å | 30 |   |
| 3 | 13 | 13a | 1 mm | 0.5μ | 100 | 12.2 |
|   |    | 13b | 50μ | 50Å | — |   |
| 4 | 14 | 14a | 1 mm | 5μ | — | 12.5 |
|   |    | 14b | 100μ | 0.5μ | 100 |   |
|   |    | 14c | 50μ | 50Å | — |   |
| 5 | 15 | 15a | 1 mm | 5μ | — | 14.0 |
|   |    | 15b | 100μ | 0.5μ | 100 |   |
|   |    | 15c | 50μ | 50Å | — |   |

| Comparative Example | Membrane | | Thickness | Pore Size | MoSx *3 | H$_2$ *4 |
|---|---|---|---|---|---|---|
| 1 | 16 | (12a) | 1 mm | 5μ | — | 3.5 |
| 2 | 17 | (12a) | 1 mm | 5μ | — | 7.8 |
|   |    | (14c) | 50μ | 50Å |   |   |

Note:
*2: wt. % of molybdenum sulfide
*3: beads of molybdenum sulfide
*4: vol. % of hydrogen From the table, it will be understood that in Example 1-5, the concentration of hydrogen gas exhausted from the second outlet port 23 was high. This means that the porous pipe elements in Examples 1-5 were effective to enhance both the production of hydrogen gas from hydrosulfide and the efficiency of separating and concentrating the hydrogen gas. In contrast, in the comparative examples 1 and 2, the concentration of hydrogen gas was low.

While there has been shown and described what are considered the preferred embodiments of the invention, it will be obvious to those skilled in the art that various alterations and modifications may be made without departing from the scope of the invention as defined by the appended claims.

What is claimed is:

1. A porous membrane for use in a chemical reaction process, the porous membrane comprising a porous support formed with interconnected micropores having an average pore size of 0.5 μm to 30 μm and having a catalytic component uniformly distributed therein, and at least one porous thin layer integrally formed on the porous support and formed with interconnected micropores having an average pore size less than 100 nm (1000 Å) and less than that of the micropores in the porous support,
wherein the porous support is arranged as a catalytic layer in the chemical reaction process to effect catalytic reaction of fluid applied thereto, and the porous thin layer is arranged as a gas separation layer to effect Knudsen diffusion for separating a specific product fluid from the reaction fluid.

2. A porous membrane as recited in claim 1 wherein the catalytic component is molybdenum sulfide.

3. A porous membrane as recited in claim 2, wherein the catalytic component is a supported precious metal catalyst.

4. A porous membrane as recited in claim 3, wherein the supported precious metal catalyst is platinum-alumina or palladium-silica-alumina.

5. A porous membrane as reacted in claim 1 wherein the porous support is made of an inorganic raw material.

6. A porous membrane as recited in claim 5, wherein the porous support is made of alumina, silica-alumina, zirconia, zeolite, porous glass or carbon.

7. A porous membrane as recited in claim 1, wherein the porous support and the porous thin layer are each made of an inorganic raw material.

8. A porous membrane as recited in claim 7, wherein the porous thin layer is less than 500 μm thick.

9. A porous membrane as recited in claim 7, wherein the porous support is made of alumina, silica-alumina, mullite, cordierite, zirconia or carbon and the porous thin layer is made of alumina, silica-alumina, zirconia, zeolite, porous glass or carbon.

10. A porous membrane as recited in claim 1, wherein the porous thin layer is less than 500 μm thick.

11. A porous membrane for use in a chemical reaction process, the porous membrane comprising a porous support formed with interconnected micropores having an average pore size of 0.5 μm to 30 μm, a first porous thin layer integrally formed on the porous support and formed with interconnected micropores having an average pore size of 0.5 μm to 30 μm and having a catalytic component uniformly distributed therein, and a second porous thin layer integrally formed on the first porous thin layer and formed with interconnected micropores having an average pore size less than 100 nm (1000 Å) and less than that of the micropores in the first porous thin layer,
wherein the first porous thin layer is arranged as a catalytic layer in the chemical reaction process to effect catalytic reaction of fluid applied thereto through the porous support, and the second porous thin layer is arranged as a gas separation layer to effect Knudsen diffusion for separating a specific product from the reaction fluid.

12. A porous membrane for use in a chemical reaction process, the porous membrane comprising a porous support having first and second surfaces and being formed with interconnected micropores having an average pore size of 0.5 μm to 30 μm, a first porous thin layer integrally formed on said first surface of the porous support and formed with interconnected micropores having an average pore size of 0.5 μm to 30 μm and having a catalytic component uniformly distributed therein, and a second porous thin layer integrally formed on said second surface of the porous support and formed with interconnected micropores having an average pore size less than 100 nm (1000 Å) and less than that of the micropores in the first porous thin layer,
wherein the first porous thin layer is arranged as a catalytic layer in the chemical reaction process to effect catalytic reaction of fluid applied thereto, and the second porous thin layer is arranged as a gas separation layer to effect Knudsen diffusion for separating a specific product from the reaction fluid applied thereto through the porous support.

* * * * *

UNITED STATES PATENT AND TRADEMARK OFFICE
CERTIFICATE OF CORRECTION

PATENT NO. : 4,865,630

DATED : September 12, 1989

INVENTOR(S) : Fumio ABE

It is certified that error appears in the above-identified patent and that said Letters Patent is hereby corrected as shown below:

On the title page, please insert the following Assignee data:

[73] Assignee: NGK Insulators, Ltd., Japan.

Signed and Sealed this

Third Day of November, 1992

Attest:

DOUGLAS B. COMER

*Attesting Officer*     Acting Commissioner of Patents and Trademarks